United States Patent
Rappas

(10) Patent No.: US 6,355,221 B1
(45) Date of Patent: Mar. 12, 2002

(54) PROCESS FOR REMOVING SOLUBLE FLUORIDE FROM A WASTE SOLUTION CONTAINING THE SAME

(75) Inventor: Alkis S. Rappas, Chagrin Falls, OH (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/286,370

(22) Filed: Apr. 5, 1999

(51) Int. Cl.⁷ .............................. C01B 7/19; C01D 11/22
(52) U.S. Cl. ..................... 423/483; 423/490; 423/158
(58) Field of Search ................. 423/490, 497, 423/158, 160, 161, 165, 481, 482, 483

(56) References Cited

U.S. PATENT DOCUMENTS

| | | | |
|---|---|---|---|
| 2,914,474 A | * 11/1959 | Hillyer et al. | 423/490 |
| 3,923,964 A | * 12/1975 | Kidde | 423/490 |
| 4,062,929 A | 12/1977 | Thompson et al. | 423/483 |
| 4,078,043 A | * 3/1978 | Becher et al. | 423/490 |
| 4,144,315 A | 3/1979 | Worthington et al. | 423/490 |
| 4,213,951 A | 7/1980 | Sikdar et al. | 423/490 |
| 4,213,952 A | 7/1980 | Sikdar | 423/490 |
| 4,264,563 A | 4/1981 | Sikdar | 423/490 |
| 4,298,586 A | 11/1981 | Sikdar | 423/490 |
| 4,308,244 A | 12/1981 | Sikdar et al. | 423/490 |
| 4,477,425 A | 10/1984 | Berry et al. | 423/485 |
| 4,734,200 A | 3/1988 | Berry | 210/667 |
| 4,965,061 A | 10/1990 | Berry et al. | 423/484 |
| 5,108,862 A | * 4/1992 | Kishimoto et al. | 430/108 |
| 5,215,632 A | 6/1993 | Fritts et al. | 423/305 |
| 5,403,495 A | * 4/1995 | Kust et al. | 423/490 |
| 5,470,559 A | * 11/1995 | Grolman et al. | 423/490 |

OTHER PUBLICATIONS

Crystallization—Take Some Solid Steps to Improve Crystallization, Christ J. Price, Chemical Engineering Progress, Sep. 1997.
The HARDTAC Process, Robert J. Cook, Jr. ©1997 Modular Env. Tech., Inc.

* cited by examiner

Primary Examiner—Ngoc-Yen Nguyen
(74) Attorney, Agent, or Firm—Patrick Kim

(57) ABSTRACT

The present invention relates to a process for recovery of particulate calcium fluoride from a waste solution containing soluble fluoride. More specifically, the invention relates to a process for removal of soluble fluoride from and recovery of fluorspar-grade calcium fluoride from an aqueous waste solution using calcium sulfate to form the calcium fluoride. One aspect of the present invention is a process for removing soluble fluoride from a solution containing such soluble fluoride, the process including: (A) mixing the waste solution with an aqueous slurry containing seed calcium fluoride particles to form a first aqueous composition; (B) mixing the first aqueous composition with a calcium containing reagent to form a second aqueous composition; (C) advancing the second aqueous composition through a tubular reactor for an effective period of time and at a velocity sufficient to permit the soluble fluoride and the calcium containing reagent to react and attach to the seed particles of calcium fluoride, the seed particles of calcium fluoride thereby increasing in size to become enhanced particles; and (D) removing from the second aqueous composition a portion of the enhanced particles of calcium fluoride.

20 Claims, 3 Drawing Sheets

PROCESS FOR REMOVING SOLUBLE FLUORIDE FROM A WASTE SOLUTION CONTAINING THE SAME

TECHNICAL FIELD

The present invention relates to a process for removing soluble fluoride from a waste solution containing such soluble fluoride. In one embodiment, the invention relates to a process for recovery of synthetic fluorspar-grade calcium fluoride from a fluoride-containing aqueous effluent using calcium sulfate to form the calcium fluoride. The present invention is particularly useful in removal of fluoride from an effluent originating from an alkylation process utilizing hydrogen fluoride (HF; hydrofluoric acid) as the catalyst. The calcium sulfate used in the inventive process may originate as a byproduct from a process for converting calcium fluoride into hydrogen fluoride. The fluorspar-grade calcium fluoride recovered from the inventive process may be used as feedstock in the hydrogen fluoride production process, which converts calcium fluoride into hydrogen fluoride. Thus, the present invention further relates to a continuous, closed-loop process recycling both fluoride and calcium.

BACKGROUND OF THE INVENTION

Environmental laws and efficient operation of wastewater treatment plants require that fluoride be removed and/or recovered from wastewater prior to discharge into the environment. Increasingly, it is being recognized that economic concerns demand recycle of materials such as fluoride for which environmental concerns demand removal from waste streams. A number of processes have been used for removal and/or recovery of fluoride from wastewater. For example, U.S. Pat. No. 4,734,200 discloses a process for treating acidic process waste water containing $SiF_6^{-2}$ and phosphorus-type contaminants, in which the waste water is treated with a strong base ion exchange resin to remove $SiF_6^{-2}$.

Similarly, U.S. Pat. No. 4,965,061 discloses a process for producing hydrofluoric acid from waste water containing $SiF_6^{-2}$, in which the $SiF_6^{-2}$ is reacted with $(NH_4)_2SO_4$ at a high pH to form $(NH_4)_2SiF_6$, from which ammonia, $Si(OH)_4$ and HF are eventually produced.

U.S. Pat. No. 5,215,632 discloses a method of removing fluoride and sulfate from an aqueous stream by adding calcium chloride and phosphate to form $CaSO_4$ and a compound of calcium, fluoride and phosphate. The $CaSO_4$ is removed as a precipitate, and carbonate is added to cause the precipitation of calcium fluoride.

A system for removal and recycle of fluoride is known as the HARDTAC process and is available from Modular Environmental Technologies, Inc. According to the company's website, (www.modenvtech.com), the HARDTAC process uses calcium chloride or lime as a source of calcium for reaction with fluoride to form calcium fluoride, and may be applied to treatment of a neutralized hydrogen fluoride acid blowdown from a refinery.

A process used and licensed by Phillips for neutralization of hydrogen fluoride and removal of fluoride uses sodium hydroxide to neutralize refinery waste hydrogen fluoride, and soluble calcium chloride as the source of calcium for formation of $CaF_2$. The process separates solid $CaF_2$ for disposal as solid waste and discharges an effluent containing sodium chloride. Another known process uses KOH to neutralize HF, and uses lime ($Ca(OH)_2$) as the source of calcium for reaction with fluoride to form $CaF_2$ and regenerates KOH for recycling to the hydrogen fluoride neutralization step.

Hydrogen fluoride for use in refinery alkylation processes is usually made from high-grade fluorspar, a $CaF_2$ mineral, in a process wherein the $CaF_2$ is treated with concentrated sulfuric acid or oleum ($H_2SO_4+SO_3$). The products of this reaction are HF and $CaSO_4$. The by-product $CaSO_4$ is generally put in a landfill, since it has previously had little or no economic value.

The hydrogen fluoride produced for use in refinery alkylation processes, as well as for other uses in the chemical processing industry, must be free of chloride contamination, due at least in part to stress corrosion cracking of steel which results from or is exacerbated by the presence of chloride. Hydrogen fluoride produced from a recovery process which utilizes calcium chloride is not suitable for such uses due to the unavoidable presence of chloride contamination in the $CaF_2$. In the process using KOH to neutralize HF, the emphasis mainly has been on recovery and recycle of KOH, and the $CaF_2$ is generally recovered as a gel, dewatered, solidified and discarded in a landfill.

Lower grade hydrogen fluoride, such as that obtained from recycling calcium fluoride obtained by using calcium chloride to precipitate fluoride and thus containing elevated levels of chloride, or which has a broad range of particle sizes and/or very small particle sizes, or which contains some excess organics, base and water, may be suitable for use in aluminum processing, but is not suitable for use in refinery alkylation processes, and for use in other areas of the chemical industry.

SUMMARY OF THE INVENTION

One aspect of the present invention is a process for removing soluble fluoride from a waste solution containing the soluble fluoride, the process including the steps of:

(A) mixing the waste solution with an aqueous slurry containing seed calcium fluoride particles to form a first aqueous composition;

(B) mixing the first aqueous composition with a calcium containing reagent to form a second aqueous composition;

(C) advancing the second aqueous composition through a tubular reactor for an effective period of time and at a velocity sufficient to permit the soluble fluoride and the calcium containing reagent to react and attach to the seed particles of calcium fluoride, the seed particles of calcium fluoride thereby increasing in size to become enhanced particles; and (D) removing a portion of the particulate of the enhanced particles from said second aqueous composition.

Another aspect of the present invention is a process for removing soluble fluoride from a waste solution containing the soluble fluoride and manufacturing hydrogen fluoride from the fluoride so removed, the process including the steps of:

(A) mixing the waste solution with an aqueous slurry containing seed calcium fluoride particles to form a first aqueous composition;

(B) mixing the first aqueous composition with a calcium containing reagent to form a second aqueous composition;

(C) advancing the second aqueous composition through a tubular reactor for an effective period of time and at a velocity sufficient to permit the soluble fluoride and the calcium containing reagent to react and attach to the seed particles of calcium fluoride, the seed particles of calcium fluoride thereby increasing in size to become enhanced particles; and (D) removing from the second aqueous composition substantially only enhanced particles having an average particle size of at least about 20 μm;

(E) treating the enhanced particles removed in step (D) with sulfuric acid to form hydrogen fluoride and calcium sulfate.

In one embodiment, the present invention includes a process for removing soluble fluoride from a waste solution containing the soluble fluoride, the process including the steps of:

(A) mixing the waste solution with an aqueous slurry containing seed calcium fluoride particles to form a first aqueous composition;

(B) mixing the first aqueous composition with calcium sulfate to form a second aqueous composition;

(C) advancing the second aqueous composition through a tubular reactor for an effective period of time and at a velocity sufficient to permit the soluble fluoride and the calcium containing reagent to react and attach to the seed particles of calcium fluoride, the seed particles of calcium fluoride thereby increasing in size to become enhanced particles; and (D) removing a portion of the enhanced particles from the second aqueous composition, wherein the portion contains substantially only particles having a size greater than about 20 μm; and (E) removing water from the second aqueous composition, wherein the water removed contains less than about 50 ppm of soluble fluoride.

Thus, the present invention provides a continuous process which enables the use of calcium sulfate tailings to recover fluoride from wastewater, wherein the wastewater is discharged from, e.g., a process which utilizes hydrogen fluoride, such as a catalytic refinery alkylation process. The inventive process may be employed to generate high grade $CaF_2$ which can be used in the manufacture of hydrogen fluoride of sufficient purity for use in the alkylation process, and which contains substantially no chloride.

DETAILED DESCRIPTION

The present invention provides a process for the continuous recycling of hydrogen fluoride and calcium sulfate by utilizing calcium sulfate, such as calcium sulfate tailings obtained as a by-product of the manufacture of hydrogen fluoride, to recover fluoride as high-grade calcium fluoride from a neutralized effluent of an alkylation process, in which the hydrogen fluoride is used as a catalyst. As a result, the process of the present invention provides the benefits of utilizing the waste material from the production of hydrogen fluoride to recover the fluoride as calcium fluoride, and to use the recovered calcium fluoride to regenerate hydrogen fluoride. The process provides a closed-loop for removal of fluoride from wastewater through reuse of the major by-product of producing the hydrogen fluoride, thus solving the problems of removal and recovery of fluoride from wastewater and accumulation of calcium sulfate tailings from manufacture of hydrogen fluoride. Throughout the present disclosure, the term "calcium sulfate" generally refers to calcium sulfate dihydrate, $CaSO_4.2H_2O$, which is also commonly known as "native calcium sulfate", "precipitated calcium sulfate" or "natural gypsum". In addition, however, the process of the present invention may also use anhydrous or partially hydrated forms of calcium sulfate.

Figure 1:
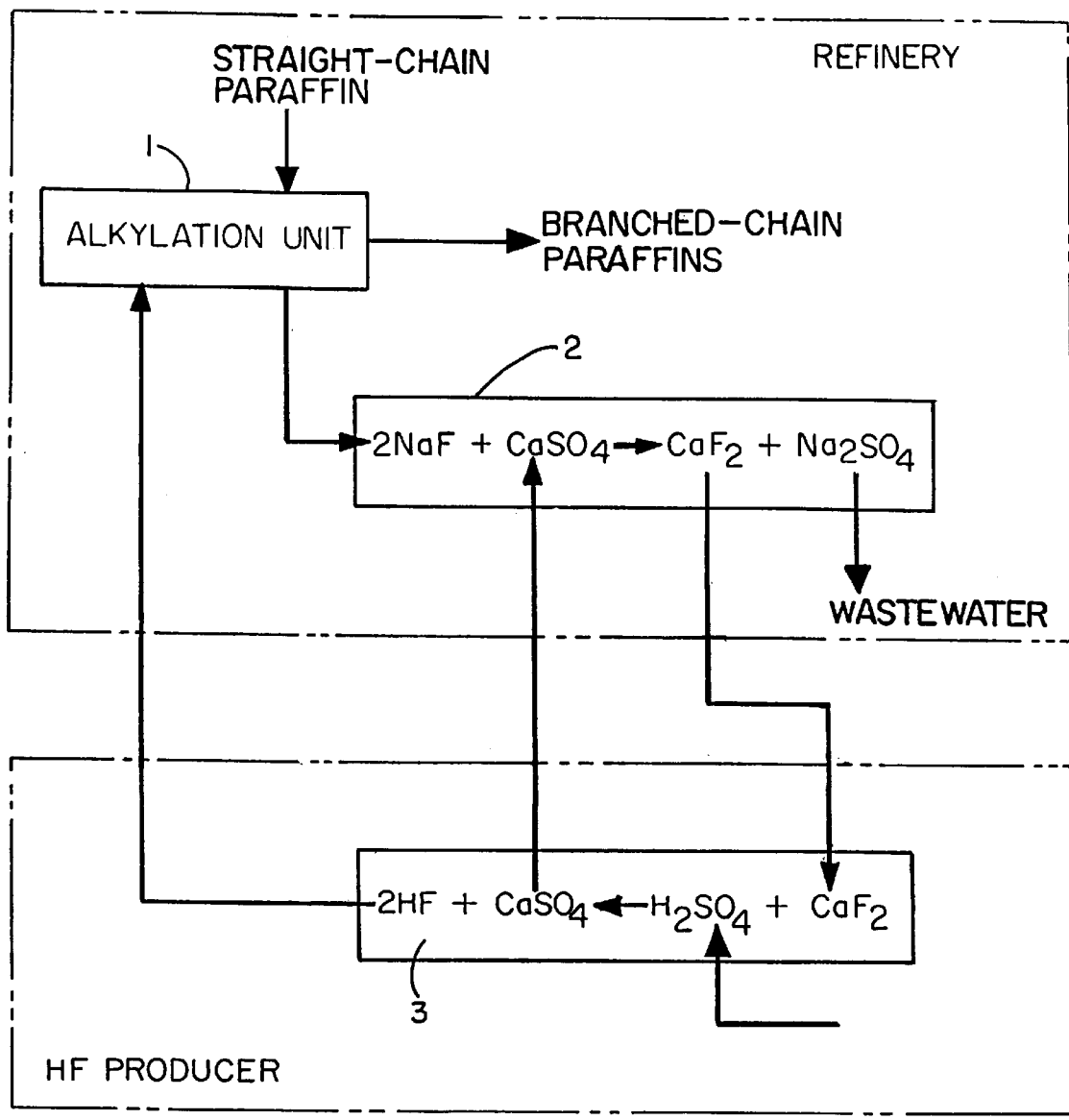
FIG. 1 is a block diagram of a refinery and hydrogen fluoride manufacturer cooperative process for continuously recycling hydrogen fluoride and calcium sulfate with intermediate recovery of calcium fluoride.

FIG. 1 is a block diagram of a cooperative process between a refinery and a hydrogen fluoride manufacturer which continuously recycles hydrogen fluoride and calcium sulfate with intermediate recovery of calcium fluoride. Beginning with the alkylation unit 1 in the refinery, high purity hydrogen fluoride is used as a catalyst, for example, in the alkylation of alkanes for use in gasoline products to increase the branching and thereby increase the octane number of the resulting gasoline products. Paraffins, such as straight-chain paraffins, generally may be alkylated by such a process to form branched chain paraffins. The alkylated products are removed for further processing. Although hydrogen fluoride acts as a catalyst in the alkylation, a portion of the hydrogen fluoride is inevitably lost from the process. Oil refineries use hydrogen fluoride as a catalyst in an alkylation process used to make alkylate products, such as highly branched octanes. A large part of the hydrogen fluoride leaves the process via the ASO, acid soluble oil, and the acid relief valve. The HF thus lost from the process is recovered and neutralized with a strong base, generally NaOH or KOH, to yield a waste solution containing soluble fluoride, which contains excess caustic and so has a high pH. This solution is commonly referred to in the industry as "spent caustic." The spent caustic, containing soluble fluoride, cannot be directly discharged to the sewer or waste water treatment plant due to the high fluoride levels, which may reach a level of about 200,000 ppm by weight, possibly higher. To remove the soluble fluoride, the spent caustic may be treated with a suitable calcium-containing compound to precipitate calcium fluoride by exploiting the very high affinity of fluoride ions for calcium. In the conventional processes, the calcium sulfate is added to the aqueous fluoride, the calcium fluoride precipitates and is collected as a gel-like mass, and is discarded in a landfill. The present invention provides a superior process for both removing and recycling the soluble fluoride.

In one embodiment, the lost hydrogen fluoride is neutralized with caustic soda, NaOH. As a result, a waste solution referred to as spent caustic and which contains soluble fluoride is obtained.

In another embodiment, potash, KOH, may be used to neutralize the lost hydrogen fluoride. In this embodiment also, a waste solution which contains soluble fluoride is obtained.

The waste solution containing soluble fluoride, shown in FIG. 1 as NaF, is transferred to a fluoride recovery step 2, in which the waste solution containing soluble fluoride is combined with a calcium containing reagent. In one embodiment the calcium containing reagent is calcium sulfate, $CaSO_4$. In one embodiment, the calcium sulfate is obtained as a by-product from a hydrogen fluoride producer. As shown in the fluoride recovery step 2, the products of the resulting reaction are particulate calcium fluoride, $CaF_2$, and sodium sulfate, $Na_2SO_4$. The sodium sulfate may be disposed of as a waste material in routine fashion. The particulate calcium fluoride is recovered, dried, and transferred to a hydrogen fluoride producer, for example, such as the hydrogen fluoride producer from which the $CaSO_4$ was obtained, or another hydrogen fluoride producer. In one embodiment, the particulate calcium fluoride is qualitatively equivalent to fluorspar, in terms of particle size, chloride contamination, total organic carbon (TOC), alkalinity and carbonate levels. An important feature of the present invention is that the particulate calcium fluoride separated from the present process, contains no more chloride than is present in natural fluorspar (about 0.05% total chloride), i.e., less than about 500 ppm chloride. This feature addresses one of the most important criteria of hydrogen fluoride producers, i.e., low chloride content. It is noted that recovered calcium fluoride having a higher level of chloride may be used by the hydrogen fluoride manufacturer, since the recovered calcium fluoride is generally mixed with natural fluorspar during manufacture of hydrogen fluoride. In one embodiment, the recovered particulate calcium fluoride contains less than about 250 ppm chloride. In one embodiment, the recovered particulate calcium fluoride contains less than about 60 ppm chloride. Thus, in these embodiments the recovered particulate calcium fluoride meets the requirements for use in manufacture of hydrogen fluoride to be used in, e.g., an alkylation process in a petroleum refinery. It is noted that in the present specification and claims, unless otherwise noted, all concentrations are on a by weight basis.

However, not all particulate calcium fluoride recovered by precipitation is useable in production of high grade hydrogen fluoride. Hydrogen fluoride producers generally require a grade of calcium fluoride known as fluorspar grade. Hydrogen fluoride producers generally require the particle size of calcium fluoride to be at least about 15–20 $\mu$m, and prefer a narrow range of particle sizes. The particle size distribution and other specifications for fluorspar grade $CaF_2$ is shown in the following Table I.

TABLE I

| Parameter | Limit |
|---|---|
| Calcium carbonate, $CaCO_3$ | <1.25% |
| Total chloride, as NaCl | <0.05% |
| Particle Size Distribution (Wet screening) | |
| Passing 40 mesh (420 $\mu$m) | 99.5% min. |
| Passing 100 mesh (149 $\mu$m) | 95% min. |
| Passing 200 mesh (74 $\mu$m) | 75% min. |
| Passing 325 mesh (44 $\mu$m) | 60% min. |
| Particles less than 5 $\mu$m | 1% |
| Particles less than 3 $\mu$m | 0.5% |

In one exemplary determination, a sample of natural fluorspar feed to hydrogen fluoride production process, about 33% of the fluorspar particles were smaller than 38 $\mu$m. In one embodiment, the range of calcium fluoride particle sizes in the feed to a hydrogen fluoride process was from about 20 $\mu$m to about 150 $\mu$m.

As shown in the lower portion of FIG. 1, in a hydrogen fluoride production step 3, the hydrogen fluoride producer reacts the calcium fluoride with sulfuric acid to form hydrogen fluoride and calcium sulfate. If the calcium fluoride meets the above-described standards, the hydrogen fluoride producer can produce hydrogen fluoride of sufficiently high quality for use in, e.g., an alkylation catalyst in a refinery. In one embodiment of the production of hydrogen fluoride from calcium fluoride, the sulfuric acid includes a quantity of $SO_3$, and is thus known as oleum. Use of oleum provides an initial hydrogen fluoride product with a lower content of water, which reduces the amount of water which subsequently must be removed to produce the substantially anhydrous hydrogen fluoride product. Anhydrous hydrogen fluoride is highly acidic and so is preferred for use as a catalyst in alkylation.

As shown in FIG. 1, the hydrogen fluoride manufactured in the hydrogen fluoride production step 3 may be transferred for use in an alkylation reaction in a refinery. Thus, as shown in FIG. 1, the cycle may be closed with respect to fluoride, between the hydrogen fluoride producer and the hydrogen fluoride user, the refinery engaged in alkylation of paraffins, in this example.

As shown in FIG. 1, calcium sulfate, $CaSO_4$, is produced as a by-product of the hydrogen fluoride production step 3, as a result of the reaction of calcium and the sulfate in sulfuric acid. As shown in FIG. 1, the calcium sulfate thus produced may be transferred to and utilized by the refinery to remove soluble fluoride from the effluent of the akylation process in the fluoride recovery step 2. Thus, as with the fluoride, in the system shown in FIG. 1 the cycle between the hydrogen fluoride producer and the hydrogen fluoride user may be closed with respect to calcium. In one embodiment of this system, only the alkali metal, e.g., $Na^+$ or $K^+$, and the sulfate are expended. Caustic soda and sulfuric acid are among the least expensive bulk chemicals used by the chemical processing industry. In embodiments in which potash is used instead of caustic soda, the potassium may be recycled as well, to form, e.g., KOH.

An embodiment of the inventive process utilizing calcium sulfate to remove, recover and recycle fluoride from an aqueous composition, obtained from the effluent from an alkylation reaction, is described hereafter.

In the present specification and appended claims, the terms "aqueous composition", "aqueous slurry" and "aqueous mixture" are defined as primarily aqueous-based materials which may have the characteristics of one or more of a solution, a slurry, a dispersion, a suspension, or other forms of aqueous mixtures which are known in the art. For example, an aqueous composition of fluoride may comprise, on one hand, a solution with respect to the fluoride present as ions of, e.g., sodium or potassium fluoride. The solubility of, e.g., sodium fluoride is about 4 g/100 ml cold water (Merck Index, 12th Ed., 1996). On the other hand, for example, an aqueous composition of fluoride may comprise predominantly a slurry, with respect to the fluoride present as calcium fluoride, which is essentially insoluble and only very slightly ionized. The solubility of calcium fluoride is about 0.0015 g/100 ml (about 15 ppm) water at 18° C.(Merck Index, 12th Ed., 1996). In such a slurry, however, a very small portion of the fluoride may be in ionic form, due to the slight solubility of calcium fluoride, or due to an excess of fluoride ions in the aqueous composition relative to the amount of calcium present. Thus, these terms may be used as names to refer to certain materials, but it is understood that the exact nature of the materials may have characteristics of one or more of solution, slurry, suspension, dispersion and other possible forms of aqueous mixture.

Figure 2:
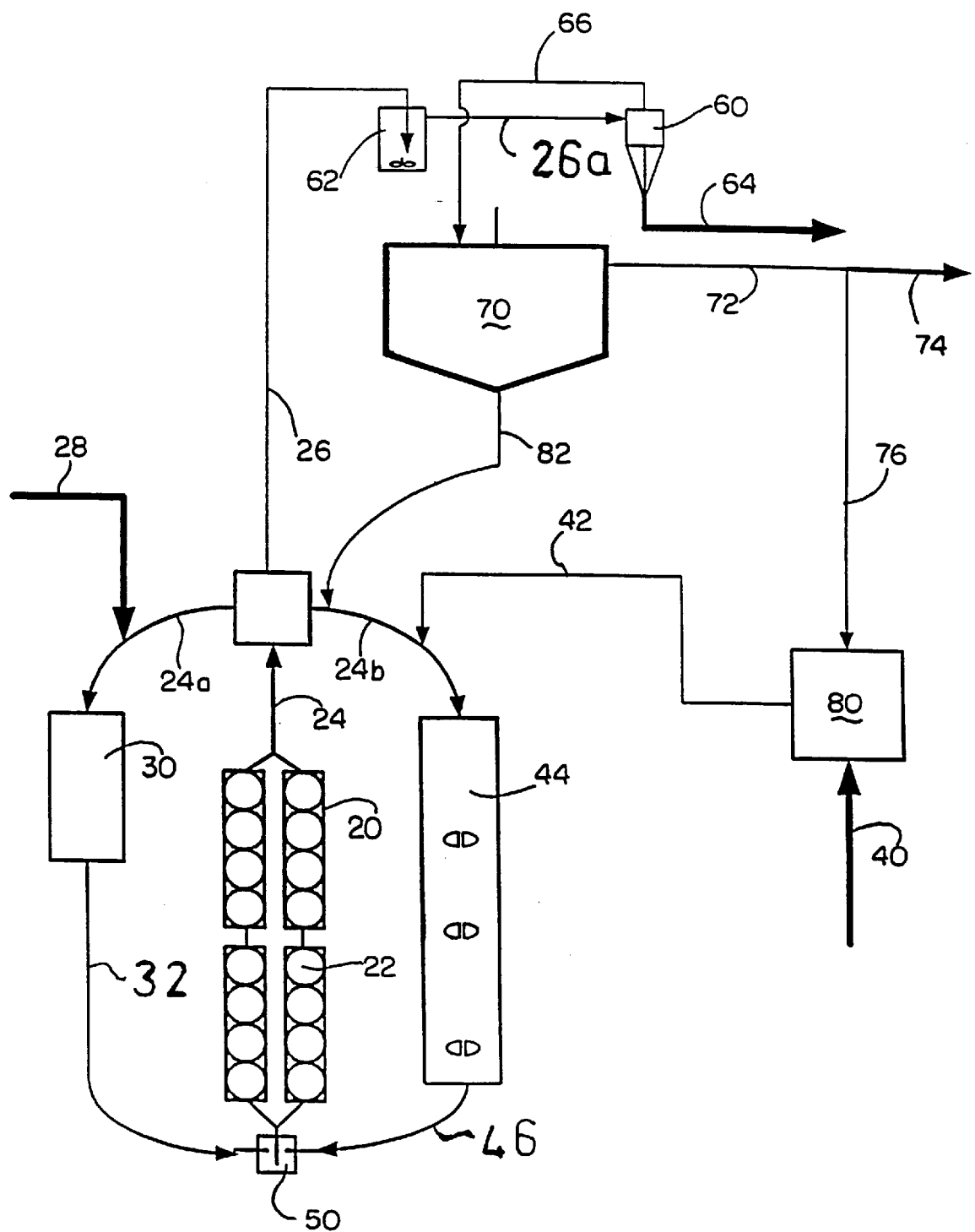
FIG. 2 is a schematic diagram of a process for recovery of fluoride as recyclable calcium fluoride.

FIG. 2 is a schematic diagram of a process for recovery of fluoride as recyclable calcium fluoride in accordance with the present invention. The process shown in FIG. 2 is, in this exemplary embodiment, a continuous process.

The process of the present invention employs a particle growth reactor 20 to obtain the desired calcium fluoride particle size. The particle growth reactor 20 comprises at least one reactor tube 22 having an inside diameter and length which, when an aqueous composition of soluble fluoride and/or particles of calcium fluoride, as defined below, is advanced through the reactor tube 22 at a velocity sufficient to avoid settling out of the particles while still maintaining a substantially "plug flow" (laminar, non-turbulent flow) regime, provides a period of time effective to permit the particles of calcium fluoride to increase in size, thereby to form enhanced particles of calcium fluoride.

As shown in the embodiment of FIG. 2, the particle growth reactor 20 may comprise a plurality of the reactor tubes 22. In one embodiment, the interior of each reactor tube 22 is open, including neither static mixing elements nor other elements inside the reactor tube. It is believed that a substantially plug or laminar flow regime is advantageous compared to turbulent flow. Plug flow is easier to maintain in multiple smaller diameter tubes while still preventing particle settling. In one embodiment, static mixing elements may be included. However, static mixing elements are not preferred since the presence of such elements tends to result in eddies in the flow of the second aqueous composition through the reactor tube 22. Such eddies can lead to settling of the particles of calcium fluoride, which is disadvantageous in the present embodiment. Similarly, in one embodiment, active mixing elements are not used in the reactor tubes 22. Active mixing can result in breakage, grinding or polishing of the particles, thus reducing the overall increase in particle size in the reactor 20.

As the quantity of the aqueous composition which is to be advanced through the particle growth reactor 20 increases, in one embodiment, the size of the reactor tube 22 is increased, and in one embodiment, additional reactor tubes 22 are added. Generally, to increase the capacity of the reactor 20, the addition of reactor tubes is preferred as compared to enlarging the reactor tubes. To increase the capacity of the present process to larger volumes of waste solutions containing soluble fluoride, in one embodiment the tubular reactor 20 is expanded by adding more reactor tubes 22 in parallel, rather than continually increasing the size of individual reactor tubes.

For example, in one embodiment the feed of the waste solution containing soluble fluoride is spent caustic solution containing soluble fluoride from an alkylation reaction, fed at the rate of about 5 gallons per minute (GPM) (19 liters/min). In this embodiment, the process uses four reactor tubes in parallel, each having a diameter of about 4 feet (1.2 m) and a length of about 18 feet (5.5 m). In another embodiment, the same feed, fed at the rate of 15 GPM (57 liters/min) uses 12 reactor tubes in parallel, each having the same diameter as the four tubes in the 5 GPM example. Thus, the process is performed by advancing the aqueous composition through the tubular reactor 20, and the tubular reactor includes a plurality of nonconcentric tubes having a length and diameter to provide the effective period of time needed to permit the particles of calcium fluoride to increase in size. The use of multiple, parallel reactor tubes allows a less expensive modular construction, which provides for easier maintenance of individual tubes without shutting down the entire system.

As shown in FIG. 2, the process may be considered to begin with an aqueous composition in a reactor effluent stream 24 which emerges from the particle growth reactor 20. The aqueous composition contains a large concentration of particulate calcium fluoride, and has characteristics similar to a slurry, and sometimes may be referred to as a slurry. The concentration of particulate calcium fluoride in the aqueous composition may be in the range from about 10 to about 250 grams per liter. In one embodiment, the concentration of particulate calcium fluoride in the aqueous composition is in the range from about 35 to about 160 grams per liter. In one embodiment, the concentration of particulate calcium fluoride in the aqueous composition is in the range from about 100 to about 150 grams per liter. In one embodiment, the concentration of particulate calcium fluoride in the aqueous composition is in the range from about 125 to about 150 grams per liter. Generally, slurry densities in excess of about 200 to about 250 grams per liter are avoided, since under the flow conditions higher densities result in breakage or size erosion of the larger particles. Furthermore, breakage of particles results in more nucleation, which competes with the desired particle growth process. The aqueous composition is primarily in the form of a slurry, but as defined above may share characteristics of other aqueous compositions.

The particulate calcium fluoride in the aqueous composition in the reactor effluent stream 24 has a range of particle sizes. A substantial portion of the particulate calcium fluoride may be considered to be seed particles, i.e., particles which are smaller than a size desired to be removed from the process, such as, e.g., 20 $\mu$m. These seed particles are subject to an increase in size, by which are formed enhanced particles of calcium fluoride, prior to being removed after attaining at least about the desired size. In one embodiment, at least a portion of the removed calcium fluoride particle sizes are at least about 20 $\mu$m in size. The range of particle sizes in the aqueous composition may be quite broad, but a narrower range is preferred, particularly for the withdrawn particles of calcium fluoride.

It is believed that the rate of growth of the smaller particles in the aqueous composition is higher than for the larger particles, and that a steady-state distribution may be achieved, resulting from a balancing of the various competing processes, including particle formation, particle breakage and particle removal. The particle size possibly may be further increased beyond those set forth above, for example by maintaining conditions in a batch fluid bed. However, a batch process is not likely to be as economically favorable as a continuous process.

The aqueous composition in the reactor effluent stream 24 is divided upon emergence from the particle growth reactor 20. In one embodiment, the aqueous composition in the reactor effluent stream 24 is divided into three portions. A first, relatively small portion is transferred for removal of a portion of the particles in a particle removal stream 26. A second, relatively large portion of the aqueous composition is removed from the reactor effluent stream 24 and is referred to as a first portion of an aqueous slurry containing seed calcium fluoride particles. The first portion of the aqueous slurry is diverted to a first recycle stream 24a for eventual recycle to the particle growth reactor 20. A third, relatively large portion of the aqueous composition is removed from the reactor effluent stream 24 and is referred to as a second portion of the aqueous slurry containing seed calcium fluoride particles. The second portion of the aqueous slurry is diverted to a second recycle stream 24b for eventual recycle to the particle growth reactor 20. In one embodiment, the first and second portions of the aqueous slurry are of approximately equal size. In one embodiment, the one portion of the aqueous slurry is larger than the other portion, by an amount equal to the volume of liquid and aqueous composition recycled from the recovery portion of the process to the one or other portion. In one embodiment, the first and second portions of the aqueous slurry are of approximately equal size but are adjusted according to the relative volumes of incoming composition containing fluoride and the volume of recycled liquid from the recovery portion of the process.

The aqueous composition in the stream 24 has a slurry density substantially equal to that in the reactor recirculating stream overall, which is in the range from about 2 to about 6 times higher than the solids generation capacity of the spent caustic feed. The term "solids generating capacity" means the maximum amount of solid calcium fluoride that can be generated when mixing the fluoride in the stream 28 with the required amount of calcium to form calcium fluoride. For example, the spent caustic from the refinery can typically generate from about 5 to about 40 grams per liter of calcium fluoride. The quantity of product being withdrawn must match the solids generation ability of the feed to maintain mass balance in the system. To maintain hydraulic balance, most of the solids (e.g., about 90–95%) and liquid in the aqueous composition must be recycled into the recirculating loop. As described below, a portion of the water also must be removed from the system to maintain hydraulic balance.

The aqueous slurry contains a range of sizes of particulate calcium fluoride. The vast majority of the particles are smaller than the desired particle size (in one embodiment) of about 15 to about 20 $\mu$m; so are subject to an increase in particle size. These smaller particles are, therefore, the desired seed particles. The first and second portions of the aqueous slurry thus contain seed calcium fluoride particles. The particles of calcium fluoride which have increased in size in the process may be referred to as enhanced particles of calcium fluoride, or simply as "enhanced particles". The enhanced particles, in one embodiment, have a median particle size in the range from about 15 $\mu$m to about 25 $\mu$m.

As shown in FIG. 2, a fluoride feed stream 28 delivers a waste solution containing soluble fluoride, containing a quantity of fluoride, to the process. The waste solution containing soluble fluoride is primarily an aqueous solution of fluoride. The fluoride in the waste solution containing soluble fluoride is primarily present as a fluoride salt, although at low pH the fluoride may be present as hydrofluoric acid (hydrogen fluoride). In one embodiment, the fluoride is present primarily as sodium fluoride. In one embodiment, the fluoride is present primarily as potassium fluoride. In other embodiments, the fluoride may be present with other counterions or with mixtures of counterions.

The waste solution containing soluble fluoride may include other materials, such as small amounts of oil, paraffins, or other organic material remaining from the process from which the waste solution containing soluble fluoride originated. If the waste solution containing soluble fluoride includes oil or other organic materials it may be beneficial to remove the oil. When the oil is present as a distinct, separate phase, it may be removed by gravity separation, air flotation and by a de-oiling hydrocyclone. Oil may also be removed by membrane ultrafiltration. The process will tolerate some quantity of organic, such as is typically present in the feed stream, but large quantities of oil should be removed.

In one embodiment, the waste solution containing soluble fluoride, contains about 200,000 ppm (weight/volume) of sodium fluoride. In one embodiment, the waste solution containing soluble fluoride, contains about 50,000 ppm (weight/volume) of sodium fluoride. In one embodiment, the waste solution containing soluble fluoride, contains about 36,000 ppm (weight/volume) of sodium fluoride. In one embodiment, the waste solution containing soluble fluoride, contains about 10,000 ppm (weight/volume) of sodium fluoride. In one embodiment, the waste solution containing soluble fluoride, contains about 1,000 ppm (weight/volume) of sodium fluoride. In one embodiment, the waste solution containing soluble fluoride, contains about 200,000 ppm (weight/volume) of potassium fluoride. In one embodiment, the waste solution containing soluble fluoride, contains about 60,000 ppm (weight/volume) of potassium fluoride. In one embodiment, the waste solution containing soluble fluoride, contains about 10,000 ppm (weight/volume) of potassium fluoride. In one embodiment, the waste solution containing soluble fluoride, contains about 5,000 ppm (weight/volume) of potassium fluoride. In one embodiment, the waste solution containing soluble fluoride, contains about 2,000 ppm (weight/volume) of potassium fluoride. In other embodiments, the counterions of fluoride comprise mixtures of sodium and potassium. In other embodiments, the counterions of fluoride comprise counterions other than sodium and potassium.

The waste solution containing soluble fluoride, in the fluoride feed stream 28, is fed into the first recycle stream 24a carrying the first portion of the aqueous slurry containing seed calcium fluoride particles, for recycle to the particle growth reactor 20. As shown in FIG. 2, a first mixing chamber 30 may be provided for mixing the aqueous slurry containing seed calcium fluoride particles and waste solution containing soluble fluoride to form a first aqueous composition. In one embodiment, the first mixing chamber 30 is a static mixer. The residence time in the first mixing chamber 30 may be about 3 minutes. Since the fluoride is in solution, longer mixing times are generally not necessary.

In one embodiment, the first mixing chamber 30 is actively mixed by, for example, a low rpm agitator. A high speed mixing apparatus, such as a centrifugal pump, is avoided due to the possibility of breaking or eroding the seed particles of calcium fluoride by the shear in such mixing apparatus. In one embodiment, the first mixing chamber is omitted, the waste solution containing soluble fluoride is mixed with the first portion of the second aqueous composition as a result of turbulence in the flow of the materials.

In one embodiment, the pH of the waste solution containing soluble fluoride is adjusted prior to step (C), to a pH below 12.5. In one embodiment, the pH of the waste solution containing soluble fluoride is adjusted prior to step (C), to a pH in the range from about 5 to about 12. In one embodiment, the pH of the waste solution containing soluble fluoride is adjusted prior to step (C), to a pH in the range from about 6 to about 9. In one embodiment, the pH of the waste solution containing soluble fluoride is not adjusted The waste solution containing soluble fluoride (with or without pH adjustment) is injected/mixed into the aqueous slurry containing seed calcium fluoride particles recirculating in the stream 24a in a ratio to yield dilution to the desired level of supersaturation of calcium and fluoride when recycled in the tubular reactor 20. The desired level of supersaturation is the level of calcium and fluoride added in excess of the solubility of calcium fluoride. In one embodiment, the desired level of supersaturation is from about 8 to about 16. In this exemplary embodiment, "the desired level of supersaturation from about 8 to about 16" means that the calculated concentration of soluble fluoride and calcium added to the system is from about 8 to about 16 times the solubility of calcium fluoride in water. Calcium fluoride has a solubility of about 15 ppm weight/volume, which is the level above which calcium fluoride is supersaturated. In one embodiment, the amount of calcium and fluoride added to the system is in the range from about 8 to about 16 times the level of supersaturation, a total of both calcium and fluoride is added which will theoretically increase the concentration of both ions to the range from about 120 ppm to about 240 ppm weight/volume. The lower level, i.e., about 8 times the level of supersaturation, is believed theoretically better, but for economic reasons, up to about 16 times the level of supersaturation is sought, so as to maximize throughput of fluoride. The atomic weights of fluorine (19) and of calcium (40) mean that the weights of fluoride and calcium are approximately equal in calcium fluoride. Thus about half the total of about 8 to about 16 times supersaturation is due to each of fluoride and calcium.

The density of the aqueous composition is controlled by measurement of the specific gravity of the aqueous composition at various points in the system. In one embodiment, the specific gravity of the aqueous composition in the stream 24 exiting the reactor is measured. In one embodiment, the specific gravity of the aqueous composition in the stream 26 is measured. The relative amounts of feed entering the system via the line 28, the amount of the aqueous composition recycled in the lines 24a and 24b, and the amount of the aqueous composition transferred for particle removal in the line 26 may be adjusted to maintain the desired density of calcium fluoride as set forth above. The specific gravity may be measured at other points in the system. Similarly, the soluble fluoride may be monitored by, e.g., a specific ion electrode at various points in the system, and the amount of calcium added adjusted accordingly to maintain a desired level of soluble fluoride, such as a maximum level.

Mixing the aqueous slurry containing seed calcium fluoride particles with the waste solution containing soluble fluoride forms a first aqueous composition. The first aqueous composition shares many of the features of the aqueous slurry containing seed calcium fluoride particles. It comprises a large number of particles of calcium fluoride. However, the first aqueous composition is relatively rich in fluoride ions, due to the addition of the waste solution containing soluble fluoride which comprises a fluoride salt. Similarly, this solution is depleted of soluble calcium, due to the excess of soluble fluoride.

The gentle mixing process is believed to provide a "conditioning/activation" of the relatively porous particles of calcium fluoride in the aqueous slurry containing seed particles with the soluble fluoride in the waste solution. The mixing dilutes the fluoride and allows the fluoride ions to be dispersed and to become associated with particles of calcium fluoride. The conditioning/activation of the particles of calcium fluoride in the aqueous slurry with the soluble fluoride is believed to be achieved within a time from about 1 to about 3 minutes residence time in the first mixing chamber 30.

The conditioning/activation in the mixing step, i.e., mixing the second portion of the aqueous slurry containing seed calcium fluoride particles with the waste solution containing soluble fluoride to form the first aqueous composition, serves several purposes. The primary purpose is to dilute and disperse the fluoride into the aqueous composition. This dilution and dispersion results in a greater likelihood of increasing the size of the particles of calcium fluoride by crystallization or agglomeration, and a reduced likelihood of simply forming additional very small particles of calcium fluoride by nucleation. It is noted that, as used herein, the process described by the term "crystallization or agglomeration" may be more akin to deposition of new calcium fluoride on the surface of the seed particles than to true crystallization. Thus, the gentle mixing steps are important in allowing the soluble fluoride and calcium to become associated with the seed particles, so that when the fluoride-calcium reactions occur, the proximity of the pre-existing seed particle will favor attachment to the particle by reacting with an appropriate ion on the surface thereof, thereby increasing the size of the particle of calcium fluoride. The formation of larger particles of calcium fluoride results in more particles of the size desired for removal from the process. The very small particles formed by nucleation are avoided, due to the fact that many more cycles are required in order to grow such particles to the enhanced particle size desired by hydrogen fluoride producers.

As shown in FIG. 2, the calcium is introduced into the process from a calcium source 40. As set forth previously and shown in FIG. 1, in one embodiment the calcium is calcium sulfate which originates from a hydrogen fluoride producer. In one embodiment, the calcium is calcium sulfate which is obtained from another source, for example, from a gypsum mining operation. In other embodiments, other calcium sources may be used, such as calcium hydroxide, calcium chloride, calcium acetate, calcium formate or calcium carbonate.

In the embodiment shown in FIG. 2, the calcium, in the calcium feed stream 42, is fed into the second recycle stream 24b, which contains the second portion of the aqueous slurry containing seed calcium fluoride particles. As a result of the mixing of these materials, a calcium containing reagent is formed. The calcium containing reagent shares many of the features of the aqueous slurry containing seed calcium fluoride particles. It comprises a large number of particles of calcium fluoride. However, the calcium containing reagent is relatively rich in calcium, due to the addition of the calcium from the calcium feed stream 42, and substantially depleted of soluble fluoride.

As shown in FIG. 2, a second mixing chamber 44 may be provided for mixing the calcium from the calcium feed stream 42 with the second portion of the aqueous slurry containing seed calcium fluoride particles to form the calcium containing reagent. In one embodiment, the second mixing chamber 44 is a static mixer. In one embodiment, the second mixing chamber 44 is actively mixed by, for example, a low rpm agitator. Due to the relatively low solubility of calcium sulfate, in an embodiment using calcium sulfate the second mixing chamber 44 should include some form of mixing, whether it is static or active. Reference is made hereafter to calcium sulfate as the form of calcium in the calcium containing reagent. It should be understood that this is exemplary, and other sources of calcium may be used.

As shown in FIG. 2, in one embodiment, the second mixing chamber 44 is substantially larger than the first mixing chamber 30. As set forth above, due to the need to maximize dissolution and dispersion of the relatively less soluble calcium sulfate in the calcium containing reagent, the second mixing chamber 44 provides more mixing than does the first mixing chamber 30. The solubility of calcium sulfate is about 0.2 g/100 ml cold water (Merck Index, 12th Ed., 1996).

Typically, the concentration of total calcium as calcium sulfate in the second mixing chamber 44 will be in the range from about 25% to about 50% of the calcium sulfate saturation concentration of about 0.2 g/100 ml. It is advantageous to achieve as high a percent soluble calcium as possible relative to the total calcium content of the calcium sulfate. A residence time of about 10 minutes in the second mixing chamber 44 has been found generally adequate to attain sufficient dissolution and dispersion of calcium sulfate. Longer residence times may be advantageous when using gypsum tailings from, e.g., a hydrogen fluoride manufacturer, due to factors such as less uniform particle size and the presence of impurities not found in natural gypsum. If other sources of calcium are used, the mixing times may have to be adjusted further, particularly when the calcium compound is not fully hydrated prior to its use in the present system. The 10 minute residence time is believed to be sufficient for effective conditioning/activation with calcium of the relatively porous calcium fluoride seed particles contained in the calcium reagent before mixing with the first aqueous composition, when fully hydrated, natural gypsum is used. Precipitated and fully hydrated calcium sulfate is more easily dissolvable than mineral gypsum or other possibly less hydrated forms of calcium sulfate.

The calcium sulfate feed preferably has a particle size as small as practical. In one embodiment, the calcium sulfate feed passes through a mesh size of 325 (i.e., approximately 44 μm). In one embodiment, the calcium sulfate passes through a mesh size of 400 (i.e., approximately 37 μm). In one embodiment, the calcium sulfate feed is wet-milled to a mesh size in the range from about 325 to about 400. Such mesh sizes assist in dissolution and pre-dilution of the calcium sulfate with the second portion of the aqueous slurry containing seed calcium fluoride particles to form the calcium containing reagent prior to the point at which if first "sees" fluoride ions. In one embodiment, the calcium sulfate is at a concentration of less than about one-half the saturation solubility of calcium sulfate, i.e., less than about 0.12 g/100 ml.

The residence time in the second mixing chamber 44 is about 10 minutes. In one embodiment, the calcium sulfate is mixed with the second portion of the aqueous slurry containing seed calcium fluoride particles with low agitation rather than stirring. In one embodiment, the calcium sulfate is mixed with the second portion of the aqueous slurry containing seed calcium fluoride particles by stirring. The mixing allows the soluble calcium to dissolve sufficiently to reach its maximum concentration relative to the total calcium in the nascent calcium containing reagent (i.e., total calcium due to calcium fluoride and calcium sulfate, and any other calcium in the aqueous composition). The dissolution of calcium sulfate is best achieved at a pH lower than about 12.

The mixing of calcium sulfate provides a conditioning/activation similar to that resulting from the mixing of the second composition containing fluoride with the first portion of the aqueous slurry containing seed calcium fluoride particles. The conditioning/activation which occurs in the step of mixing the calcium sulfate with the second portion of the aqueous slurry containing relatively porous seed calcium fluoride particles to form the calcium containing reagent serves several purposes. The primary purpose is to dissolve and disperse the calcium sulfate into the aqueous composition. This dilution and dispersion results in a greater likelihood of growing the particles of calcium fluoride due to crystallization (as defined and described above), and a reduced likelihood of simply forming additional very small particles of calcium fluoride by nucleation. The growing of larger particles of calcium fluoride results in more particles of the size desired for removal from the process. Particles formed by nucleation are disfavored, due to the fact that many more cycles are required in order to grow the particles of calcium fluoride to the enhanced particle size desired. Of course, some amount of nucleation will inevitably take place.

In one embodiment, the calcium sulfate is dissolved or dispersed in water prior to mixing with the second portion of the aqueous slurry containing seed calcium fluoride particles to form the calcium containing reagent. In one embodiment, the water in which the calcium sulfate is dissolved or dispersed initially is water recycled from a subsequent step of dewatering, described hereafter.

As shown in FIG. 2, the first aqueous composition, which emerges from the first mixing chamber 30 in a line 32, and the calcium containing reagent, which emerges from the second mixing chamber 44 in a line 46, are mixed to form a second aqueous composition. In one embodiment, as shown in FIG. 2, the mixing of the first aqueous composition and the calcium containing reagent is performed in a reactant premixing and distribution chamber 50.

Figure 3A:
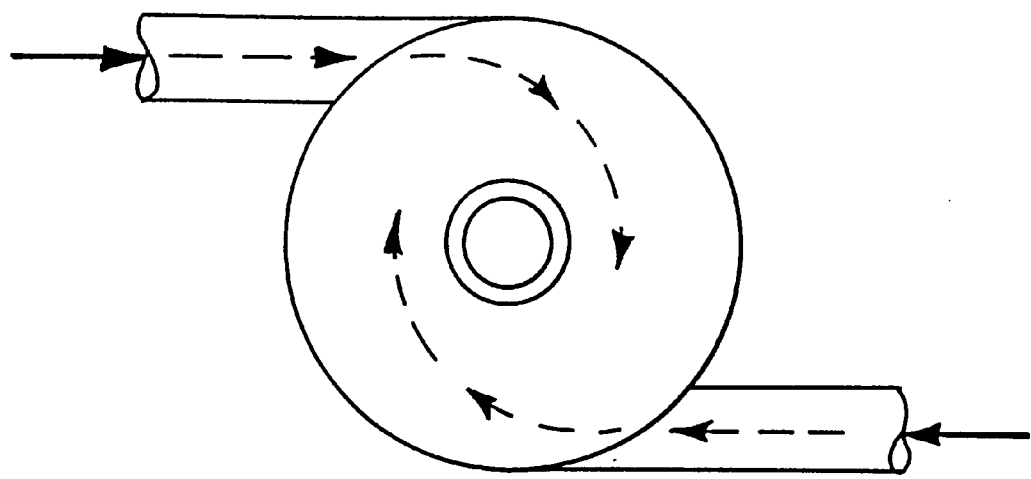
FIGS. 3a and 3b are, respectively, a top plan view, and a side cross-sectional view, of a premixing and distribution chamber in accordance with one embodiment of the present invention.
Figure 3B:
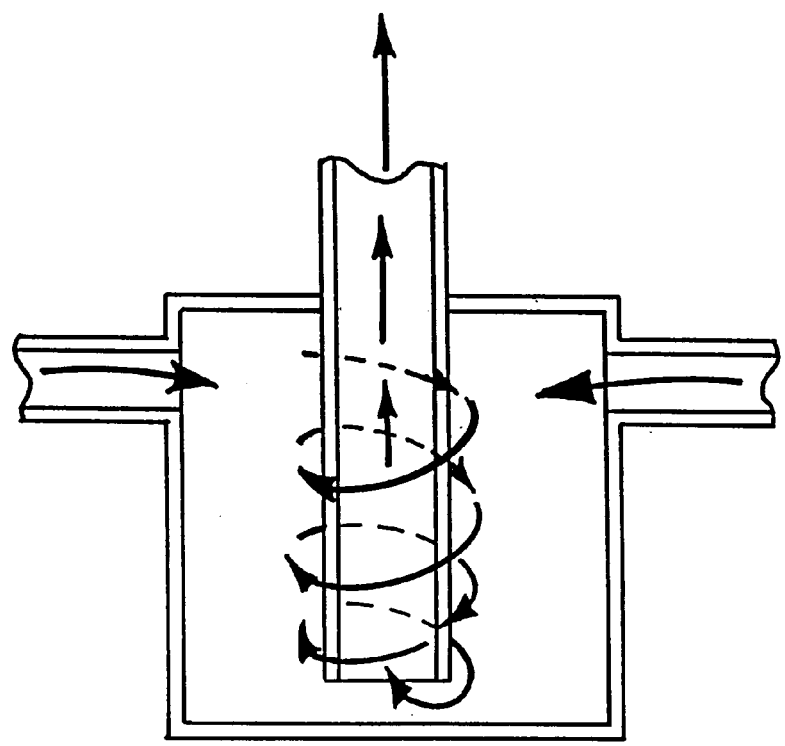

FIGS. 3a and 3b are, respectively, a top plan view, and a side cross-sectional view, of one embodiment of the premixing and distribution chamber 50 in accordance with one embodiment of the present invention. In one embodiment, the first aqueous composition and the calcium containing reagent are initially brought together and mixed briefly in the chamber 50, prior to introduction to the particle growth reactor 20. The premixing and distribution chamber 50 provides a brief, gentle but thorough mixing of the two streams of aqueous composition, and then distributes the resulting mixture evenly to the multiple parallel tubes 22 of the tube reactor 20. In one embodiment, the premixing and distribution chamber 50 is a tangential mixing chamber having a concentric outlet tube, as shown in FIGS. 3a and 3b. In FIGS. 3a and 3b, the first aqueous composition enters the mixing and distribution chamber 50 via the line 32, and calcium containing reagent enters the chamber 50 via line 46, to form the second aqueous composition. As shown in these figures, the aqueous compositions enter the chamber in tangential paths. The concentric outlet 52 is placed and sized so as to provide a brief but thorough mixing of the respective aqueous compositions prior to distribution to the reactor tubes 22 of the reactor 20.

In one embodiment, the initial bringing together and mixing is not separately performed in a premixing chamber, but instead is performed as part of introducing the first aqueous composition and the calcium containing reagent into the particle growth reactor 20, thus forming the second aqueous composition.

The second aqueous composition obtained by mixing the first aqueous composition and the calcium containing reagent is maintained in the particle growth reactor 20 for an effective period of time to permit the particles of calcium fluoride to increase in size. In so doing, the particles become enhanced particles. Enhanced particles, as used herein, generally means particles of calcium fluoride which have undergone an increase in size in the reactor 20. In one embodiment, the enhanced particles have a median particle size in the range from about 15 μm to about 25 mμ. Some reaction between calcium and fluoride takes place during the initial mixing of the first aqueous composition and the calcium containing reagent, but preferably most of the reaction takes place gradually during the period in which the second aqueous composition is maintained in the particle growth reactor 20, thereby favoring particle growth as opposed to nucleation.

The present inventor has found that by carefully controlling each of the steps of mixing the respective portions and the step of advancing the second aqueous composition through the reactor, the reaction of calcium and fluoride can be "pushed" towards growing the particles of calcium fluoride already in existence in the second aqueous composition to form the enhanced particles, rather than toward forming new particles. Thus, the step of mixing the first portion of the aqueous slurry containing seed calcium fluoride particles with the waste solution containing soluble fluoride to form the first aqueous composition is carefully controlled to insure adequate mixing to provide the desired conditioning/activation. Similarly, the step of mixing the second portion of the aqueous slurry with the calcium sulfate to form the calcium containing reagent is carefully controlled to insure adequate mixing to provide the desired conditioning/ activation. Finally, the step of mixing the first aqueous composition with the calcium containing reagent to form the second aqueous composition is carefully controlled, so that particle growth and formation of enhanced particles preferentially occurs, as opposed to nucleation. These steps, together with maintaining the second aqueous composition in the particle growth reactor 20 for an effective period of time, result in growth of the seed calcium fluoride particles into enhanced particles of a desired, predetermined size. The growth of these particles may include crystallization, agglomeration and like processes. Crystallization is of course preferred, but is not always attained exclusively. Thus, the size of the seed calcium fluoride particles may be increased by a combination of processes such as hard agglomeration and crystallization, as defined above. The enhanced particles formed by the present process may have a generally "cauliflower-like" appearance. In other words, the enhanced particles may have a rounded, unevenly bulbous appearance.

The second aqueous composition is maintained in motion in the particle growth reactor 20 for an effective period of time to permit the soluble fluoride and the calcium containing reagent to react to attach to the seed calcium fluoride particles, the seed particles of calcium fluoride thereby increasing in size. This favorable result is obtained by advancing the second aqueous composition through the particle growth reactor 20 at a linear velocity sufficient both to provide the effective period of time and to maintain the particles of calcium fluoride in a slurry or suspended state, i.e., to prevent settling out of the particles. In one embodiment, the linear velocity is in the range from about 8 to about 20 times the theoretical Stokes settling velocity.

In one embodiment, the linear velocity is in the range from about 10 to about 16 times the theoretical Stokes settling velocity. In one embodiment, the linear velocity is about 14 times the theoretical Stokes settling velocity. The theoretical Stokes settling velocity is calculated based on the desired median particle size, for example from about 15 $\mu$m to about 25 $\mu$m. As is known, the greater the horizontal velocity of a particle, the lower the settling velocity and thereby the effective, net settling rate. This is generally the theoretical basis for the preference that the flow rate be maintained within the above described range of excess over the theoretical Stokes settling velocity.

The combination of the dimensions of the tubular reactor 20 and the linear velocity at which the second aqueous composition is advanced through the tubular reactor provide a residence time in the tubular reactor effective to allow the maximum increase in particle size in the reactor. Within limitations imposed by the need for maintaining a linear velocity, the dimensions (i.e., inside diameter and length) of the tubes in the tubular reactor may be varied. The range of variation of the tube dimensions is limited by, e.g., the ability to pump a large volume of a slurry or other aqueous composition having a high loading of solids (the particles of calcium fluoride) at the requisite velocity to avoid settling in a reactor tube having a very large cross-section. For such reasons adding more reactor tubes is the preferred way to increase capacity, rather than increasing the diameter of the tubes.

When the second aqueous composition has advanced through the particle growth reactor 20, and emerges therefrom, the aqueous composition which was described above has effectively been recirculated or recycled through the process. At this point, having been in the tubular reactor for a period of time effective for the seed calcium fluoride particles to increase in size and for the enhanced particles to reach a steady-state particle size distribution, a portion of the particles have grown from a smaller size to a size greater than 20 $\mu$m. As briefly set forth above, the process includes removal of a portion of the enhanced particles of calcium fluoride from the second aqueous composition, and removal of a portion of the water, sulfate and other materials from the second aqueous composition. Such removal of water, sulfate and other materials is necessary to maintain hydraulic and material balance in the system in which the process of the present invention is carried out.

The present invention is not limited to a particular type of pump for recirculating the aqueous compositions of the present invention. Various pumps known in the art for pumping slurry-like materials are suitable for use with the present invention. Positive displacement-type pumps are particularly favored. Types of pumps which generate an appreciable level of shear, such as centrifugal pumps, should not be used with the present invention. Shear results in the breakage of the particles of calcium fluoride, thus reducing particle size and leading to an increase in the rate of secondary nucleation.

The soluble fluoride concentration in either the stream 24 or the stream 26, or elsewhere in the system, may be measured with a specific ion electrode and the result used to make small adjustments in the rate of calcium sulfate feed. The soluble fluoride level may be measured at other points in the system, such as a holding tank (described below). The soluble fluoride concentration in both streams may be measured. The fluoride concentration at this point is selected as the end point, and may be about 30 to about 50 ppm fluoride (weight/volume). Lower levels of fluoride may be attained by increasing the relative amount of calcium to fluoride fed into the system above the stoichiometric ratio.

As described herein, the fluoride ion concentration may be measured by a specific ion electrode placed in a stream containing the aqueous composition, at various points in the system. It is noted that the specific ion electrode should be calibrated accordingly, e.g., without addition of buffer and concomitant readout adjustment to compensate for the dilution resulting from addition of the buffer, as normally would be done in a laboratory determination.

Referring still to FIG. 2, a description follows of the process of separating the particles of calcium fluoride and removing water and other materials for maintaining material and hydraulic balances. As set forth above and shown in FIG. 2, a first, relatively small portion of the aqueous composition emerging from the particle growth reactor 20 is transferred via the particle removal stream 26 for removal of a portion of the particles. The volumetric flow of this stream equals the sum of the volumetric flow rates of the streams 28 and 42 and any other source of liquid added to the system, in order to maintain hydraulic balance in the system. Examples of such additional liquids include wash water from washing of a calcium fluoride filter cake removed from the process, and water used or solution used to adjust the pH of one or more streams in the system.

A portion of the particles of calcium fluoride are removed from this portion of the aqueous composition by separating a portion of the enhanced particles relatively larger in size from the remainder of the relatively smaller particles of calcium fluoride and other materials in the aqueous composition. In one embodiment, the portion of larger enhanced particles is removed in a hydrocyclone 60. The hydrocyclone 60 selectively removes a portion of the particles of calcium fluoride having a size greater than a predetermined size. In one embodiment, the predetermined size is about 20

μm. In that embodiment, particles having a size of at least about 20 μm are selectively removed by the hydrocyclone 60. In one embodiment, the hydrocyclone 60 removes substantially only particles larger than about 20 μm. In one embodiment, the hydrocyclone 60 removes substantially only particles within a range of size from about 20 μm to about 60 μm. In one embodiment, the hydrocyclone 60 removes particles within a range of size from about 5 μm to about 60 μm. In one embodiment, the hydrocyclone 60 removes particles within a range of size from about 15 μm to about 30 μm. In one embodiment, the hydrocyclone 60 removes particles within a range of size from about 15 μm to about 20 μm. In one embodiment, the hydrocyclone 60 removes particles within a range of size from about 15 μm to about 25 μm. There is no real upper limit on the particle size which may be removed by the hydrocyclone 60, other than the limits imposed by the increased susceptibility to breakage of large particles and by the largest particle likely to be formed in the process. As used herein, particle size is defined as an effective diameter and is measured by, e.g. a Microtrac® (Leeds & Northrup Company) or similar particle analyzer, or by other means such as a scanning electron microscope.

The hydrocyclone underflow containing the separated particles of calcium fluoride is filtered and washed to yield the final product. A vacuum or a pressure filter with provision for steam drying is advantageous in isolating and drying the particles. The particles of calcium fluoride separated from the second aqueous composition and having a particle size distribution such as that specified for fluorspar grade calcium fluoride, or a median size of at least about 20 μm, and meeting other requirements, such as very low chloride, low total organic carbon (TOC), low alkalinity and low carbonate levels, are suitable for use in production of high grade hydrogen fluoride for use in, e.g., a refinery alkylation process.

The portion of the aqueous composition emerging from the tubular reactor 20 and transferred to the particle removal step in the particle removal stream 26 has the same composition as the remainder of the aqueous composition emerging from the particle growth reactor 20. Since in one embodiment the other portions of the aqueous composition are recycled via the first and second recycle streams 24a and 24b, in this embodiment the particle removal stream 26 provides a means by which material and hydraulic balances in the process may be maintained. As shown in FIG. 2, the particle removal stream 26 may be transferred into a holding tank 62, prior to its transfer via a stream 26a to the hydrocyclone 60. In one embodiment, the holding tank 62 includes a mechanical stirring or mixing device to prevent the particles of calcium fluoride from settling. Like other mixing devices in the system, the mixing device in the holding tank 62 should be selected so as to avoid particle breakage and shear. The holding tank 62 provides a buffer, to avoid backups in the system in case of, e.g., malfunction in the hydrocyclone 60, or for other reasons. In one embodiment, the particle removal stream 26 is transferred directly to the hydrocyclone 60, obviating the need for a holding tank and avoiding the need for further mixing of the stream. In one embodiment, an operator may select between direct transfer to the hydrocyclone 60 and transfer to the holding tank 62. In one embodiment, and during startup of the process, the entirety of the stream 26 may be returned to the process, bypassing the hydrocyclone 60, thereby removing no particles of calcium fluoride. In one embodiment during start-up, the stream 26 is transferred to the hydrocyclone 60, but no particles of calcium fluoride are taken off in the underflow, thereby effectively bypassing the hydrocyclone 60.

As shown in FIG. 2, the particles of calcium fluoride removed by the hydrocyclone 60 exit the hydrocyclone 60 via a particle line 64. The particles are thereafter washed and dried in preparation for transfer to, e.g., a hydrogen fluoride producer. The quantity of particles of calcium fluoride removed from the aqueous composition forms only a small minority of the total quantity of particles of calcium fluoride in the second aqueous composition. The great majority of the aqueous composition originally delivered by the particle removal stream 26 to the hydrocyclone 60 exits the hydrocyclone 60 via a dewatering stream 66, and the great majority of this stream is recycled to the system after a portion of the water has been removed. Furthermore, not all the particles of calcium fluoride having a size greater than the predetermined size are necessarily removed by the hydrocyclone 60 in each pass of the aqueous composition therethrough. The material which exits the hydrocyclone, from which a portion of the particles of calcium fluoride have been removed, is relatively depleted in such particles, and thus constitutes a depleted aqueous composition, and these smaller particles may also be considered as and referred to as constituting seed particles of calcium fluoride. The dewatering stream 66 transfers the depleted aqueous composition to a dewatering tank 70. In the dewatering tank 70, a portion of the water is removed from the depleted aqueous composition. The quantity of water removed at this stage is substantially equal in volume to the total volume of fluids added elsewhere in the process, and may be adjusted as needed to maintain hydraulic balance in the system.

The water removed from the depleted aqueous composition, and thus from the aqueous composition in the system as a whole, is substantially free of fluoride. The term "substantially free of fluoride" means that the maximum level of fluoride remaining in the removed water is less than about 50 ppm (weight/volume). To attain still lower levels of fluoride, the effluent may be further treated, or polished, with additional calcium. The calcium for such further treatment may be from calcium sulfate, calcium chloride or other source of calcium, such as calcium hydroxide. This polishing is an alternative to use of a superstoichiometric ratio of calcium to fluoride in the mixing steps of the process.

Both the depleted aqueous composition and the water removed therefrom in the dewatering tank 70 (as well as the other aqueous compositions and mixtures in the system) contain the counterions of the fluoride and calcium fed into the system in addition to the particles of calcium fluoride. Thus, in one embodiment, the water contains sodium and sulfate, generally in the form of either monosodium sulfate, $NaHSO_4$, or disodium sulfate, $Na_2SO_4$, or both. In one embodiment, the water contains potassium and sulfate, generally in the form of monopotassium sulfate $KHSO_4$, dipotassium sulfate, $K_2SO_4$, or both. Of course, in other embodiments, the water may contain mixtures of sodium and potassium, or other cations which may be added purposely or which may find their way into the system as impurities. In one embodiment, the water contains calcium sulfate due to the addition of a super-stoichiometric ratio of calcium sulfate to the quantity of fluoride added to the system.

As shown in FIG. 2, the water removed from the dewatering tank may be discharged via a discharge stream 72. The discharge stream 72 may be discharged as a waste effluent via an effluent stream 74, or may be re-used via a water return stream 76. The water discharged as a waste via the effluent stream 74 may require further treatment to meet wastewater discharge limitations, depending on what other chemical or biological species may be present therein.

The water returned for re-use via the water return stream 76 may advantageously be used to dissolve the calcium sulfate entering the system from the calcium source 40. If the re-used water in the return stream 76 contains calcium sulfate, such calcium sulfate is thereby recycled to the process.

The present process has been described herein with calcium sulfate as the preferred source of calcium. This is primarily for economic and environmental reasons. The process for removing particulate calcium fluoride will work equally well with other sources of calcium, such as lime (calcium hydroxide, $Ca(OH)_2$) or calcium chloride ($CaCl_2$). However, these alternate embodiments do not enjoy all the benefits provided by and available from the present process. For example, in the embodiment in which calcium chloride is used, the resulting calcium fluoride may not be suitable for use in manufacture of high-grade hydrogen fluoride, due to the presence of and difficulty in removing the chloride contamination in the calcium fluoride. As a further example, if either calcium chloride or lime are used, the economic and environmental benefits obtained by recycling calcium sulfate may not be obtained.

The water returned for re-use in the water return stream 76 is mixed with the calcium sulfate obtained from the calcium source 40 to form an aqueous calcium composition in a calcium sulfate mixing tank 80. As set forth above with respect to the other aqueous compositions in the present process, the aqueous calcium composition may have the properties of a solution, a suspension, a slurry or other known compositions of calcium in aqueous media. At the stage in the mixing tank 80, the concentration of calcium sulfate may be relatively high, so that the aqueous calcium composition will be supersaturated in calcium sulfate, and so may have characteristics more like a slurry or suspension than a solution, although, some amount of calcium sulfate of course will be in solution.

The aqueous calcium composition in the mixing tank 80 may be provided via the calcium feed stream 42 to be mixed with the second portion of the aqueous slurry containing seed calcium fluoride particles in the second recycle stream 24b, as described above.

The removal of water from the depleted aqueous composition forms a regenerated aqueous composition. The regenerated aqueous composition differs from the aqueous composition emerging from the tubular reactor 20 in having a smaller number of relatively large particles of calcium fluoride. It may thus be considered to constitute an aqueous slurry containing seed calcium fluoride particles. As shown in FIG. 2, the regenerated aqueous composition exiting the dewatering tank 70 is returned to the recirculating aqueous composition via a return stream 82. In one embodiment, shown in FIG. 2, the regenerated aqueous composition in the return stream 82 is returned to the second recycle stream 24b. In one embodiment, not shown, the regenerated aqueous composition is returned in the return stream to the first recycle stream 24a. In other embodiments, not shown, the regenerated second aqueous composition may be returned in the return stream to other points in the recirculating system.

Thus, the basic features of a process of removing fluoride from a wastewater in the form of particles of calcium fluoride has been described. The process described in the foregoing, and shown in FIG. 2, may be summarized as a process for removing soluble fluoride, in the form of particulate calcium fluoride, from a waste solution containing such soluble fluoride, the process comprising:

(A) mixing the waste solution with an aqueous slurry containing seed calcium fluoride particles to form a first aqueous composition;

(B) mixing the first aqueous composition with a calcium containing reagent to form a second aqueous composition;

(C) advancing the second aqueous composition through a tubular reactor for an effective period of time and at a velocity sufficient to permit the soluble fluoride and the calcium containing reagent to react and attach to the seed particles of calcium fluoride, the seed particles of calcium fluoride thereby increasing in size to become enhanced particles; and (D) removing a portion of the enhanced particles from the second aqueous composition.

In one embodiment of the process, step (B) uses a quantity of the calcium containing reagent in about a stoichiometric ratio to the quantity of soluble fluoride in the second aqueous composition. In one embodiment of the process, step (B) uses a quantity of the calcium containing reagent in excess of the stoichiometric ratio to the quantity of soluble fluoride in the second aqueous composition, the excess being in the range from about 1 to about 10%. In one embodiment, the calcium containing reagent is used at an excess of the stoichiometric ratio to the quantity of soluble fluoride of about 1%. In one embodiment, the calcium containing reagent is used at an excess of the stoichiometric ratio to the quantity of soluble fluoride of about 2%. In one embodiment, the calcium containing reagent is used at an excess of the stoichiometric ratio to the quantity of soluble fluoride of about 5%. It is noted that the total quantity of soluble fluoride entering the second aqueous composition, i.e., prior to mixing with the calcium reagent, is substantially the same as the total quantity of soluble fluoride in the waste solution being fed into the process.

In one embodiment, the pH of the aqueous slurry in the system is monitored and controlled to be within a range from about 5.0 to about 8.5. In one embodiment, the pH of the aqueous slurry is monitored in the line 26, or in the tank 62. In one embodiment, the pH of the aqueous slurry is controlled by injections of an appropriate amount of sulfuric acid or caustic soda or lime ($Ca(OH)_2$) in the line 24, the line 26 or the tank 62. In one embodiment, the pH of the aqueous slurry is controlled by adjusting the pH of the second aqueous composition by addition of essentially calcium-free caustic or fluoride-free acid at a point prior to where the aqueous composition is mixed with the incoming waste solution in the first recycle stream 24a. In one embodiment, the material used to adjust the pH may contain species such as calcium and fluoride. pH adjustment provides the benefits of favoring a narrower range of particle size distribution in the final product by helping to avoid flocculation of the calcium fluoride. In one embodiment, the pH is monitored at a plurality of points in the system.

In one embodiment, the pH of the waste stream is adjusted prior to feeding it to the process, as set forth above.

In one embodiment of the process, step (C) is performed by advancing the second aqueous composition through a particle growth reactor 20 which has a tubular configuration. In one embodiment, the particle growth reactor 20 is an open tubular reactor, and includes a plurality of nonconcentric tubes. In one embodiment, each of the tubes has a length and diameter such that, when the second aqueous composition is advanced through the particle growth reactor 20 at a linear velocity which is sufficient to insure that there is no possibility of any settling out of the particles of calcium fluoride, an effective period of time is provided to permit the particles of calcium fluoride to increase in size.

As described above, the enhanced particles of calcium fluoride removed in step (D) may be reacted with sulfuric acid to form hydrogen fluoride and calcium sulfate. If the calcium fluoride obtained from the process meets the requirements of the hydrogen fluoride producer, the hydrogen fluoride once used in a refinery process such as alkylation may be regenerated and fully recycled to the refinery for reuse. As also described above, the process may use in step (B) the calcium sulfate obtained from the hydrogen fluoride manufacture in a step of producing hydrogen fluoride by reacting particulate calcium fluoride with sulfuric acid.

EXAMPLES

In comparative tests, solutions containing soluble fluoride were mixed with solutions of calcium sulfate. An approximate measure of particle size of solid particles not chemically hydrated can be obtained by collecting the particles in a filter cake and determining the total solids of the filter cake by weighing the filter cake before and after drying to constant weight at 105° C. The difference in weight is expressed as percent solids. A percent solids in the range from about 30% to about 50% indicates small particles, i.e., in the range from sub-micron to about 5 micrometers. A percent solids in the range from about 80% to about 90% indicates larger particles, i.e., in the range from about 10 $\mu$m to about 60 $\mu$m.

In a first test (performed in duplicate), a solution containing a quantity of soluble fluoride was prepared by dissolving 25.2 g sodium fluoride in water for a total solution weight of 504 g. The pH of this solution was adjusted from an initial 9.7 to 7.0 by addition of sulfuric acid. A slurry of calcium sulfate was prepared by adding 56.8 g of calcium sulfate dihydrate with a final weight of 168 grams. This amount of calcium sulfate provides a 10% stoichiometric excess of calcium relative to the quantity of fluoride. These solutions were mixed by quickly pouring together the solutions with stirring. The mixture was stirred for approximately 50 hours. The particles of calcium fluoride particles were collected into a filter cake by filtration. The solids content of the filter cake was determined on duplicate tests to be 50.95% and 48.58% solids, thus indicating a small particle size of the calcium fluoride particles in the filter cakes. The filtrate from the first series of tests, corresponding to an effluent, contained a residual fluoride concentration of 19.8 ppm. These tests show that calcium sulfate is effective in removing fluoride from an aqueous solution containing soluble fluoride. These tests also show that simply mixing calcium sulfate and a stream containing soluble fluoride results in formation of very small particles of calcium fluoride.

In a second test (performed in duplicate), to a solution containing a quantity of soluble fluoride identical to that of the first test was added a slurry of calcium sulfate identical to that of the first test, except the addition was performed incrementally, by adding the calcium sulfate slurry in 30 g aliquots (last aliquot 20 g), at the rate of one aliquot per hour. At the end of the addition, the mixture was stirred for an additional 18 hours. The particles of calcium fluoride particles were collected into a filter cake by filtration. The solids content of the filter cake was determined on duplicate tests to be 41.9% and 43.3% solids, thus indicating a small particle size of the calcium fluoride particles in the filter cakes. The particles of calcium fluoride obtained from this test were examined in a scanning electron microscope, which revealed calcium fluoride particles ranging in size from 0.1 $\mu$m to about 0.5 $\mu$m. The filtrate from the second series of tests, corresponding to an effluent, contained a residual fluoride concentration of 21 ppm. These tests show that calcium sulfate is effective in removing fluoride from an aqueous solution containing soluble fluoride. These tests also show that simply mixing calcium sulfate and a stream containing soluble fluoride results in formation of very small particles of calcium fluoride.

In a series of tests using apparatus in accordance with particular embodiments of the invention, various solutions containing soluble fluoride and various calcium containing reagents were fed into the apparatus under various conditions. The following five examples provide a detailed review of these tests, and demonstrate the efficacy of the apparatus and process of the present invention.

Example 1

Synthetic Neutralized Spent Caustic and Reagent Grade $CaSO_4.2H_2O$

To simulate a refinery spent caustic from a process starting with 4.5 wt % NaOH and ending with 1.2 wt % NaOH residual alkalinity, the following Synthetic Neutralized Spent Caustic feed (SNSC) was prepared by dissolving in water 34.7 grams NaF, and 21.3 grams sodium sulfate for each liter of solution to be used in the tests. Sufficient solution was prepared to fill the reactor loop at start-up (5 liters) and to run the test for up to about 40 hours at the intended feed rate of about 8.3 ml/minute. Thus, about 24 liters of SNSC feed solution were made.

The calcium sulfate slurry for this test was prepared by adding to water 72.47 grams of reagent grade $CaSO_4.2H_2O$ to water for each liter of slurry to be used in the test. Thus, about 20 liters of this slurry was prepared, which, when delivered at 8.3 ml/minute, is sufficient for about 40 hours. This quantity of calcium represent a stoichiometric ratio of about 102% of the amount of fluoride, i.e., the calcium containing reagent is used at an excess of the stoichiometric ratio to the quantity of soluble fluoride of about 2%.

In this test, the reactor comprised a single, vertical tube (2 inches (5 cm) in diameter, 24 inches (61 cm) high, equipped with static mixing elements. The reactor loop was preloaded with a 21.3 g/l sodium sulfate solution. The targeted feed rates for both spent caustic and calcium sulfate were 8.3 ml/minute, the reactor recycle rates were 3 liter/minute each (via lines 24a and 24b in an apparatus such as shown in FIG. 2). Small rate adjustments were made during the run to maintain the desired ratio of calcium to fluoride, as determined for the aqueous composition in the stream 26 by measuring the fluoride concentration in the holding tank 62. The target soluble fluoride concentration in the stream 26 was 60 ppm. The actual fluoride concentration in the stream 26 varied slightly from this value, and was controlled by adjusting the addition rate of calcium sulfate. This example had no initial calcium fluoride seed in the recirculating aqueous composition. All calcium fluoride produced during the approximately 32 hours of the run was recycled to the reactor loop, although with removal of sufficient clear effluent to maintain hydraulic balance.

Samples were withdrawn from the reactor loop at time intervals to determine specific gravity and slurry density (g solids/liter aqueous composition, g/l) changes. The following was observed:

| Time | Specific Gravity | Slurry Density |
| --- | --- | --- |
| 6 hours | 1.025 | (not measured) |
| 13 hours | 1.051 | 5.92 g/l |
| 21 hours | 1.058 | 7.72 g/l |
| 29 hours | 1.072 | 9.56 g/l. |

This test was terminated after 29 hours. The final calcium fluoride slurry product was filtered and the solids content of two samples of the wet cake was determined to be 49.79, and 49.32 wt %, respectively. Examination under the microscope (SEM) showed that the particles were larger than those in the control test described above (sub-micron), but still rather small in the 5 micron range.

Example 2

SNSC and Reagent Grade $CaSO_4 \cdot 2H_2O$, with Added Calcium Fluoride Seed

This example was performed exactly as Example 1, except calcium fluoride seed was added to the sodium sulfate start-up solution. 336.17 g of the filter cake obtained in Example 1, containing 165.8 g of particles of calcium sulfate (dry) were used to pre-load the 5 liter reactor recycle loop. The test was completed in 32 hours. The slurry density increased as shown below:

| | |
| --- | --- |
| 0 hours | 3.4 g/l |
| 16 hours | 11.69 g/l |
| 24 hours | 13.08 g/l |
| 32 hours | 13.84 g/l |

The final product settled to 55.92 wt % solids, and the filter cake contained 76.4 wt % solids. Examination under SEM showed particle sizes in the range of 10–15 microns.

Example 3

SNSC and Reagent Grade $CaSO_4 \cdot 2H_2O$, with Added Calcium Fluoride Seed

This example was performed as in Examples 1 and 2, except that 74.125 grams of the filter cake (55.92 wt % solids) from Example 2 was used as the calcium fluoride seed particles to pre-load the 5 liter reactor recycle loop, and the recycle rates were decreased from the previous 3.0 l/min, to 500 ml/min each (in the streams 24a and 24b).

The slurry density observed at the following times was:

| | |
| --- | --- |
| 0 hours | 2.65 g/l |
| 5 hours | 2.90 g/l |
| 15 hours | 5.68 g/l |
| 23 hours | 7.53 g/l |
| 30 hours | 9.69 g/l |

The final slurry at 30 hours settled to 49.6 wt % solids, the wet filter cake (by vacuum filtration) contained 77.8 wt % solids, and the filter cake by pressure filtration (30 minutes with air break-through) contained 86.6 wt % solids. Examination under SEM showed a substantial fraction of the enhanced particles in the range of 25–35 microns and appearing as cauliflower-like hard agglomerates.

Example 4

Refinery Neutralized (ASO) Spent Caustic, with Calcium Sulfate Tailings from HF Manufacturer The reactor used in Example 4 comprised 4 vertical, parallel tubes (3/4 inch (1.9 cm) diameter, 44 inches (112 cm) high), and a tangential mixer/distributor (such as the mixer 50 shown in FIG. 3) for the fluoride and calcium streams at the reactor inlet. The recycle rate was set at 2.0 l/min each (in each of the streams 24a and 24b). The first and second mixing chambers 30 and 44 were of equal size, 1 liter each, and the second mixing chamber 44 did not include mechanical mixing or stirring.

In Example 4, the targeted slurry density in the reactor recycle loop was 200 g solids/liter. The actual slurry density varied in the approximate range from about 165 to about 210 g/l (weighted average about 180–185 g/liter) due to the periodic, manual solids recycle procedure (from the dewatering tank 70) required to maintain the targeted operating slurry density in the reactor loop. Example 4 did not include removing particles of calcium fluoride, such as in the hydrocyclone 60, and all solids produced over the 280 hour duration of the run were settled and stored in the dewatering tank 70, prior to recycling into the system.

The reactor loop (4 liter capacity) was pre-loaded with fluorspar seed (800 g) in a sodium sulfate solution (21.3 g/l). The fluorspar seed was the wet screening fraction having a particle size from about 38 $\mu$m to about 53 $\mu$m obtained by wet grinding (ball mill) of natural fluorspar mineral such as that used in HF manufacturing.

The calcium sulfate tailings were wet ground (ball mill) and screened to about 325 mesh (about 45 $\mu$m). The calcium sulfate delivery rate was adjusted around the calculated value for stoichiometric addition of calcium so as to maintain the target value of about 60 ppm fluoride (actual) in holding tank 62. During the 280 hour run, the fluoride concentration varied between 43 and 90 ppm, with the soluble calcium concentration varying between 30 and 7.5 ppm, respectively.

The refinery spent caustic was further neutralized by adding the required amount of HF to a final pH of about 9.4 before feeding to the test. The strength of the original refinery fresh caustic was 4.5 wt % NaOH. Typically, the caustic is considered spent when there is about 1 wt % NaOH residual. The HF added to adjust the pH to 9.4 substantially neutralizes the residual NaOH in the refinery spent caustic, and increases the fluoride concentration accordingly. In an actual process, the pH would be adjusted with, e.g. sulfuric acid, rather than the more expensive (and fluoride containing) hydrofluoric acid. The pH-adjusted spent caustic, which is a waste solution containing soluble fluoride, is allowed to stand in a container for 2 days to separate and to allow removal by skimming of any free oil that originates from the ASO. The waste solution containing soluble fluoride is withdrawn from the standing container at a point well below the surface to ensure that no free oil enters the reactor loop.

The results showed that the particle size distribution broadened initially and then reached a steady state after about 80 hours. As mentioned above, in this Example, fluorspar seed was used having a zero time particle size distribution in the range from 38 $\mu$m to 53 $\mu$m. During the course of the experiment described in this Example, the particle size distribution changed as shown in the following table, in wt % for particles greater than 45 $\mu$m, in the range from 38 to 45 $\mu$m; and less than 38 $\mu$m as follows with time:

| Time, hours | >45 μm, % | 38–45 μm, % | <38 μm, % |
|---|---|---|---|
| 36 | 29.8 | 16.8 | 53.3 |
| 55 | 21.4 | 16.9 | 61.6 |
| 70 | 19.5 | 16.8 | 63.7 |

Examination by SEM revealed that the fluorspar seed particles are well defined, coarse particles with the appearance of broken glass. These particles thus have a low surface area relative to their mass, and thereby have a low susceptibility to an increase in particle size, relative to the precipitated cauliflower-like product from the Examples 1–3 and the present process. Later samples of the calcium fluoride particles show that a more cauliflower-like morphology is achieved as the original seed is exchanged out of the reaction loop. Also, the steady state distribution initially broadens and shifts to lower sizes (8–10 micron median under these test conditions). Nevertheless, the enhanced calcium fluoride particles are significantly larger than those from the above-described control tests, which were sub-micron in size.

It was observed that the much larger calcium fluoride particles were subjected to self-grinding, polishing and particle breakage, which is observed at high slurry density and high recycle flow rates. Such self-grinding, polishing and particle breakage may be due to the greater inertial forces affecting the larger particles. The larger particles which have undergone grinding, polishing and particle breakage have the appearance of rounded beach pebbles, and some show obvious signs of breakage. Both of these observations indicate an undesirable increase in secondary nucleation. The smaller particles still have the characteristic cauliflower morphology. Thus, the system should not be operated to maximize particle size, but to optimize the distribution of particle sizes to provide a maximum amount of enhanced particles in the desired size range.

The average fluoride concentration in the spent caustic feed (stream 28) was about 21,000 ppm. The average actual fluoride concentration in the effluent was less than about 50 ppm. Since the average flow rates of the feed stream 28 and of the calcium sulfate slurry stream 42, with no flow in the stream 76 (i.e. use of fresh water in the calcium source 80) were approximately equal, the overall continuous-process fluoride removal efficiency relative to the feed was calculated as:

$$(1.0-((2\times 50)/21,000))\times 100 = 99.52\%$$

Example 5

SNSC with Calcium Sulfate Tailings from HF Manufacturing

Example 5 was performed substantially the same as Example 4, except as described in the following:

(a) the feed was SNSC, as in Examples 1–3;
(b) the reactor was the same as in Example 4, but the volume of the first mixing chamber 30 was reduced to 500 ml, and the volume of the second mixing chamber 44 was increased to 1,500 ml, while the total volume of the reactor loop remained the same at 4 liters;
(c) slow stirring was provided to the second mixing chamber 44. As a result of the stirring and the change in mixing chamber size, the average residence time for calcium sulfate particles in the chamber 44 was increased by a factor of about 9 times relative to that of Example 4, the same recycle rates being used in both Examples. This provided additional time for dissolution and dispersion of the calcium sulfate;
(d) the recycle flow rates in the streams 24a and 24b was about 800 ml/minute, each;
(e) 89.4 grams of product calcium fluoride slurry (55.98 wt % solids) from Example 2 was added to the start-up reaction loop solution, which also contained 21.3 g/l sodium sulfate;
(f) the process was run for about 36 hours with all solids recycled until the desired fixed operating slurry density of 125 g solids/liter (target) was reached, and recycling the amount of liquids to maintain hydraulic balance. Then, the amount of required product solids was removed at 1 hour intervals, and the rest recycled to maintain solids and hydraulic balance;
(g) to simulate the hydrocyclone step 60 separation of the coarser fraction of the solids as the product, separatory funnels were used as follows: After passing through the holding tank 62 (where fluoride concentration was measured), the aqueous composition flowing in stream 26 was collected in a beaker. At 30 minutes intervals, the filled beaker was replaced with an empty one. The collected slurry was added to a separatory funnel, and shaken well. Then, the slurry was allowed to settle while observing the fast drop of the coarser particles and build-up of the settled material on the bottom. When the level of the settled coarser particles reached the volume of slurry required to be withdrawn to maintain solids mass balance, this amount only was withdrawn by partially opening the stopcock of the funnel. The rest of the slurry was recycled. This operation was repeated through the duration of the test (from hour 37 to hour 62). The remainder of the solids in the separatory funnel were returned to the recycling system. All the funnel "underflows", i.e. the enhanced particles of calcium fluoride product from a practically continuous process at steady state, were mixed and collected. This product was evaluated under the SEM relative to the starting seed.

The product from Example 2, which was used as the seed for Example 5, had particles with a median size in the range from about 10 μm to about 15 μm. The product from this test had a large fraction of enhanced particles with a size in the range from about 25 μm to about 30 μm. Finer particles co-settling with the coarser ones in this gravity setting separation simulation(simulating the hydrocyclone 60) would be significantly reduced in the inertial separation conditions of a hydrocyclone. Additionally, adjustment of the pH to obtain a dispersed slurry fed into the hydrocyclone will further narrow the particle size distribution of the separated larger particles) by reducing the amount of entrained fines.

As shown by the foregoing examples, seed calcium fluoride particles in the first aqueous composition, when mixed with a calcium containing reagent to form a second aqueous composition and advanced through a tubular reactor for an effective period of time, undergo an increase in size to form enhanced particles, and may be removed selectively, while recycling the remainder of the calcium fluoride particles to provide for increase in size thereof.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for removing soluble fluoride from a waste solution containing said soluble fluoride, said process comprising:
   (A) mixing said waste solution with an aqueous slurry containing seed calcium fluoride particles to form a first aqueous composition;
   (B) mixing said first aqueous composition with a calcium sulfate containing reagent to form a second aqueous composition;
   (C) advancing said second aqueous composition through a tubular reactor comprising a plurality of non-concentric tubes having a length and diameter to provide for an effective period of time and at a velocity sufficient to permit said soluble fluoride and said calcium sulfate containing reagent to react and attach to said seed particles of calcium fluoride, said seed particles of calcium fluoride thereby increasing in size to become enhanced particles; and
   (D) removing from said second aqueous composition a portion of said enhanced particles.

2. The process of claim 1, wherein a portion of said second aqueous composition is recycled through said tubular reactor.

3. The process of claim 1, wherein said aqueous slurry containing seed calcium fluoride particles comprise a first recycle portion of said second aqueous composition.

4. The process of claim 1, further comprising, following step (D), a step of removing water from said second aqueous composition and said water contains less than about 50 ppm soluble fluoride.

5. The process of claim 4, wherein said calcium sulfate containing reagent comprises a portion of said water containing less than about 50 ppm soluble fluoride.

6. The process of claim 1, wherein step (B) uses a cylindrical mixing and distribution chamber having a concentric outlet tube, said calcium sulfate in at least about a stoichiometric ratio to said soluble fluoride in said waste solution, and said first aqueous composition and said calcium sulfate containing reagent enter said chamber in tangential paths.

7. The process of claim 1, further comprising a step of recycling a portion of said second aqueous composition from step (D) as at least a portion of said aqueous slurry in step (A).

8. The process of claim 1, wherein the pH of said second aqueous composition is adjusted to a pH in the range from about 6 to about 9.

9. The process of claim 1, wherein said second aqueous composition is maintained in motion through said non-concentric tubes at a linear velocity in the range from about 8 to about 20 times the theoretical Stokes settling velocity based on median particle size, and said tubes have a length and diameter to provide said effective period of time to permit said seed particles to increase in size to become said enhanced particles.

10. The process of claim 6, wherein said advancing is at a sufficient linear velocity that said calcium fluoride particles do not settle out in said tubular reactor.

11. The process of claim 6, wherein said calcium sulfate containing reagent is formed by mixing calcium sulfate in a second recycle portion of said second aqueous composition.

12. The process of claim 6, wherein said enhanced particles separated from said second aqueous composition during step (D) contain less than about 500 ppm chloride, and said process further comprising, following step (D), a step of removing water from said second aqueous composition, and said water contains less than about 50 ppm soluble fluoride.

13. A process for removing soluble fluoride from a waste solution containing said soluble fluoride, and manufacturing hydrogen fluoride from the fluoride so removed, said process comprising:
   (A) mixing said waste solution with an aqueous slurry containing seed calcium fluoride particles to form a first aqueous composition;
   (B) mixing said first aqueous composition with a calcium sulfate containing reagent to form a second aqueous composition;
   (C) advancing said second aqueous composition through a tubular reactor comprising a plurality of parallel tubes having a length and diameter to provide for an effective period of time and at a velocity sufficient to permit said soluble fluoride and said calcium sulfate containing reagent to react and attach to said seed particles of calcium fluoride, said seed particles of calcium fluoride thereby increasing in size to become enhanced particles;
   (D) removing from said second aqueous composition enhanced particles having an average particle size of at least about 20 $\mu$m; and
   (E) treating said enhanced particles removed in step (D) with sulfuric acid to form regenerated hydrogen fluoride containing less than about 500 ppm chloride and regenerated calcium sulfate.

14. The process of claim 13, wherein a portion of said second aqueous composition is recycled through said tubular reactor.

15. The process of claim 14, wherein said calcium sulfate comprises regenerated calcium sulfate obtained from step (E).

16. The process of claim 13, wherein step (B) uses a cylindrical mixing and distribution chamber having a concentric outlet tube, said calcium sulfate in at least about a stoichiometric ratio to said soluble fluoride in said waste solution, and said first aqueous composition and said calcium sulfate containing reagent enter said chamber in tangential paths.

17. The process of claim 13, wherein said second aqueous composition is maintained in motion through said parallel tubes at a linear velocity in the range from about 8 to about 20 times the theoretical Stokes settling velocity base on median particle size, and said tubes have a length and diameter to provide said effective period of time to permit said seed particles to increase in size.

18. The process of claim 17, wherein said advancing is at a sufficient linear velocity that said enhanced particles do not settle out in said tubular reactor.

19. The process of claim 13, wherein at least a portion of said waste solution originates from a refinery alkylation process, and the pH of said waste solution is adjusted to a pH in the range from about 5 to about 12.

20. A process for removing soluble fluoride from a refinery process waste solution containing said soluble fluoride, said process comprising:

(A) mixing said waste solution with an aqueous slurry containing seed calcium fluoride particles to form a first aqueous composition;

(B) mixing said first aqueous composition with a calcium sulfate containing reagent to form a second aqueous composition;

(C) advancing said second aqueous composition through a tubular reactor comprising non-concentric tubes at a linear velocity in the range from about 8 to about 20 times the theoretical Stokes settling velocity based on median particle size, for an effective period of time to permit said soluble fluoride and said calcium sulfate containing reagent to react and attach to said seed particles of calcium fluoride, said seed particles of calcium fluoride thereby increasing in size to become enhanced particles;

(D) removing a portion of the enhanced particles from said second aqueous composition, wherein said portion contains substantially only enhanced particles having a size greater than about 20 $\mu$m; and (E) removing water from said second aqueous composition, wherein said water removed contains less than about 50 ppm of soluble fluoride.

* * * * *

UNITED STATES PATENT AND TRADEMARK OFFICE
CERTIFICATE OF CORRECTION

PATENT NO. : 6,355,221 B1  Page 1 of 5
APPLICATION NO. : 09/286370
DATED : March 12, 2002
INVENTOR(S) : Alkis S. Rappas It is certified that error appears in the above-identified patent and that said Letters Patent is hereby corrected as shown below:

| Col. | Line | | |
|---|---|---|---|
| 4 | 58, 59 | "one embodiment the calcium" should read: --one embodiment, the calcium-- | |
| 5 | 20 | "in these embodiments the" should read: --in these embodiments, the-- | |
| 5 | 34 | "is shown in the following" should read: --are shown in the following-- | |
| 9 | 20 | "so are subject to an" should read: --so they are subject to an-- | |
| 9 | 46 | "materials it may be" should read: --materials, it may be-- | |
| 10 | 43 | "fluoride is not adjusted" should read: --fluoride is not adjusted.-- | |
| 10 | 43, 44 | THERE SHOULD BE A PARAGRAPH BREAK BETWEEN THESE TWO LINES. | |

UNITED STATES PATENT AND TRADEMARK OFFICE
CERTIFICATE OF CORRECTION

PATENT NO. : 6,355,221 B1
APPLICATION NO. : 09/286370
DATED : March 12, 2002
INVENTOR(S) : Alkis S. Rappas It is certified that error appears in the above-identified patent and that said Letters Patent is hereby corrected as shown below:

| Col. | Line | | |
|---|---|---|---|
| 13 | 5, 6 | "composition, when fully hydrated, natural gypsum is used." should read: --composition, and when fully hydrated, natural gypsum is used." | |
| 13 | 18 | "point at which if first" should read: --point at which it first-- | |
| 14 | 22, 23 | "and calcium containing" should read: --and the calcium containing-- | |
| 15 | 59 | "reasons adding more reactor" should read: --reasons, adding more reactor-- | |
| 16 | 3 | "particles have grown from" should read: --particles has grown from-- | |
| 16 | 58 | "calcium fluoride are removed" should read: --calcium fluoride is removed-- | |

UNITED STATES PATENT AND TRADEMARK OFFICE
CERTIFICATE OF CORRECTION

PATENT NO. : 6,355,221 B1
APPLICATION NO. : 09/286370
DATED : March 12, 2002
INVENTOR(S) : Alkis S. Rappas It is certified that error appears in the above-identified patent and that said Letters Patent is hereby corrected as shown below:

| Col. | Line |
|---|---|

| 18 | 13, 14 | "not all the particles" | should read:
--not all of the particles--

| 18 | 19 | "have been removed, is" | should read:
--has been removed, is--

| 19 | 16 | "use in manufacture of" | should read:
--use in the manufacture of--

| 19 | 19 | "or lime are used," | should read:
--or lime is used,--

| 22 | 35 | "this slurry was prepared," | should read:
--this slurry were prepared,--

| 22 | 37 | "of calcium represent a" | should read:
--of calcium represents a--

UNITED STATES PATENT AND TRADEMARK OFFICE
CERTIFICATE OF CORRECTION

PATENT NO. : 6,355,221 B1
APPLICATION NO. : 09/286370
DATED : March 12, 2002
INVENTOR(S) : Alkis S. Rappas It is certified that error appears in the above-identified patent and that said Letters Patent is hereby corrected as shown below:

| Col. | Line | |
|------|------|---|
| 22 | 43 | "(61 cm) high, equipped"<br><br>should read:<br>--(61 cm) high), equipped-- |
| 23 | 27 | "sulfate (dry) were used"<br><br>should read:<br>--sulfate (dry), were used-- |
| 23 | 47 | "Example 2 was used"<br><br>should read:<br>--Example 2 were used" |
| 24 | 67 | "45 um; and less than"<br><br>should read:<br>--45 um, and less than-- |
| 25 | 44 | "the calcium source 80)"<br><br>should read:<br>--the calcium source 80),-- |
| 26 | 4 | "24a and 24b was"<br><br>should read:<br>--24a and 24b were" |

UNITED STATES PATENT AND TRADEMARK OFFICE
CERTIFICATE OF CORRECTION

PATENT NO. : 6,355,221 B1
APPLICATION NO. : 09/286370
DATED : March 12, 2002
INVENTOR(S) : Alkis S. Rappas It is certified that error appears in the above-identified patent and that said Letters Patent is hereby corrected as shown below:

| Col. | Line | |
|------|------|---|
| 26 | 7 | "Example 2 was added"<br><br>should read:<br>--Example 2 were added-- |
| 26 | 21 | "At 30 minutes intervals,"<br><br>should read:<br>--At 30 minute intervals,-- |
| 26 | 45 | "in this gravity setting"<br><br>should read<br>--in this gravity settling-- |
| 26 | 51 | "larger particles) by reducing"<br><br>should read:<br>--larger particles by reducing-- |

Signed and Sealed this

Twenty-sixth Day of September, 2006

JON W. DUDAS
*Director of the United States Patent and Trademark Office*